Nov. 10, 1942.    C. J. ENGLERT    2,301,774
DRIVING GEAR FOR BICYCLES
Filed Nov. 14, 1940    3 Sheets-Sheet 1
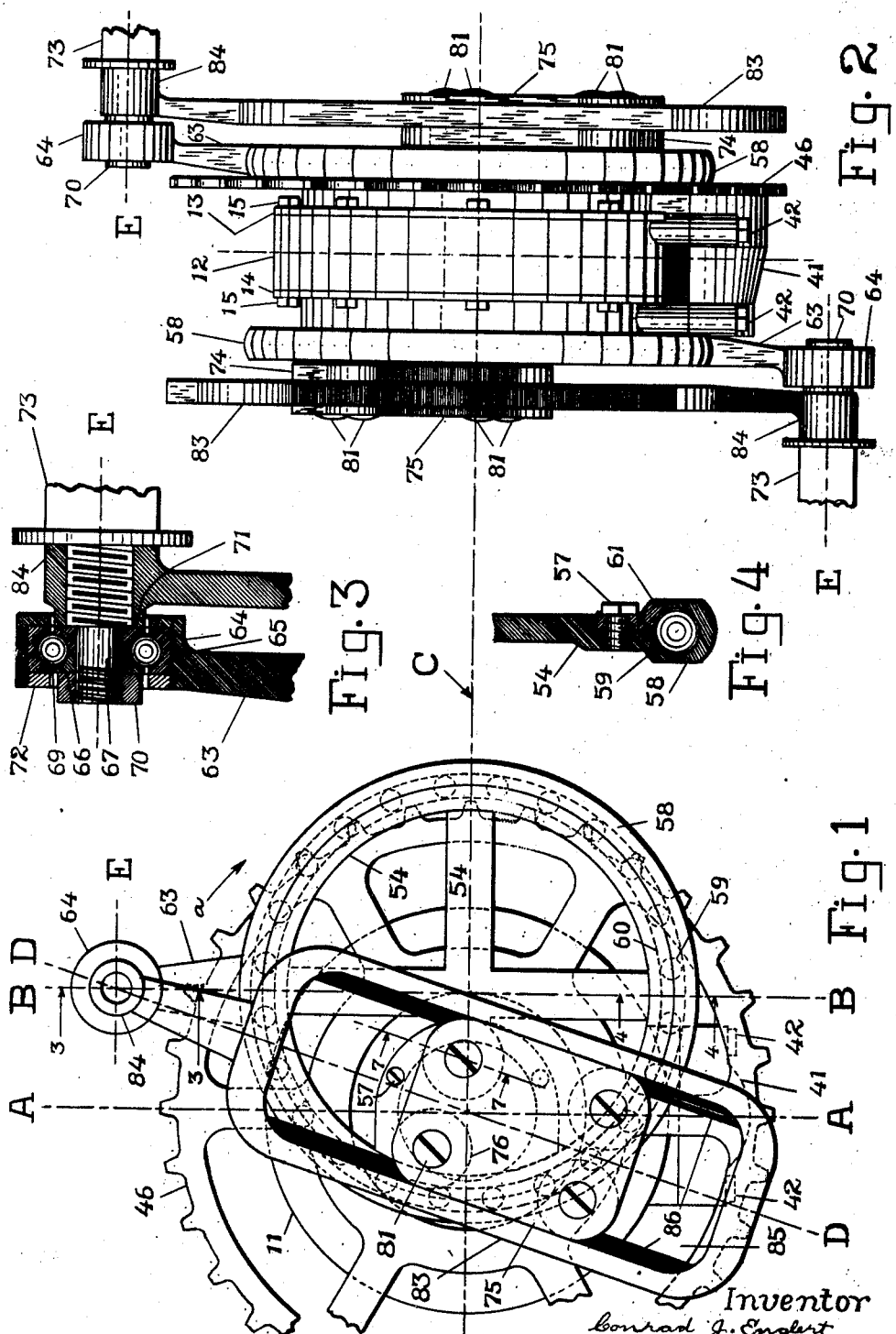

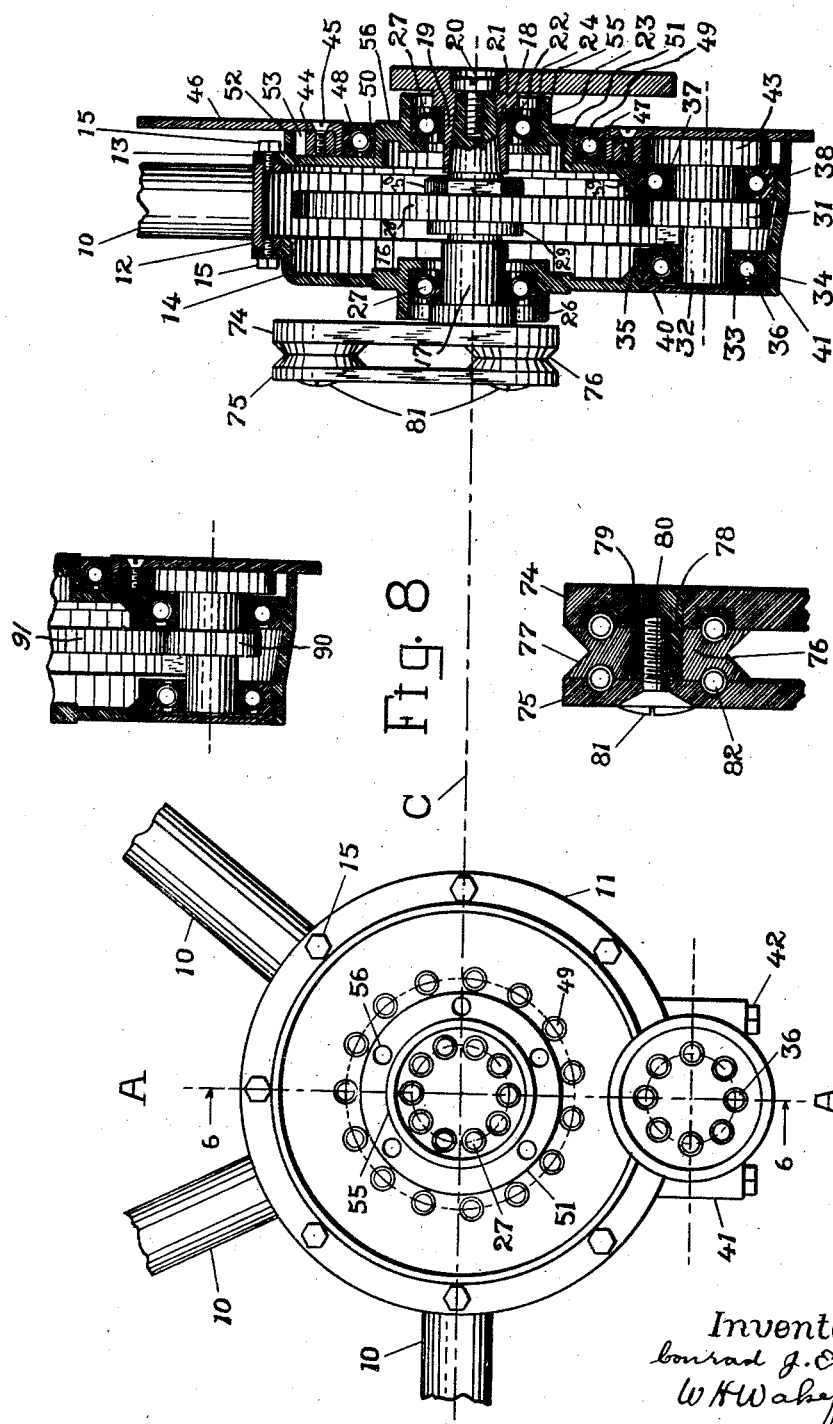

Nov. 10, 1942.   C. J. ENGLERT   2,301,774
DRIVING GEAR FOR BICYCLES
Filed Nov. 14, 1940   3 Sheets-Sheet 3

Inventor
Conrad J. Englert
W H Wakefield
Attorney

Patented Nov. 10, 1942

2,301,774

UNITED STATES PATENT OFFICE 2,301,774

DRIVING GEAR FOR BICYCLES

Conrad J. Englert, Schenectady, N. Y.

Application November 14, 1940, Serial No. 365,690

9 Claims. (Cl. 74—413)

This invention relates to the driving gear for bicycles and the general object of the invention is to provide such a gear constructed to give the bicycle rider a mechanical advantage on the working stroke of the pedals.

In the ordinary bicycle the pedals and pedal arms rotate about the axis of the driving sprocket and the rate of motion of the pedals and sprocket are the same throughout a revolution of the latter. The up or return stroke of the pedal requires the same time as the down or working stroke and the pedal remains at the same radial distance from the sprocket axis at all times. When the pedal arms are horizontal the leverage is most favorable, but the length of the lever arm is limited by the distance between the ground and the sprocket axis.

It is an important object of my invention to mount the pedals and their arms so they turn about an axis located forwardly of the sprocket axis and provide driving connections between the pedal arms and sprocket. By this arrangement the vertical stroke of the pedal remains as usual but the pedal arm when horizontal places the pedal at a distance from the sprocket axis greater than the length of the pedal arm. A mechanical advantage is thereby gained on the working stroke but the high and low positions of the pedals are the same as in the ordinary bicycle.

In the usual bicycle the sprocket and pedal arms are fastened together and one revolution of the pedals produces one revolution only of the sprocket. In my present invention I introduce a gear and pinion connection between the sprocket and pedal arms so proportioned as to cause the sprocket to turn faster than the pedals, thereby taking advantage of the increased power growing out of the eccentric mounting of the pedal arms. Where desired, however, the gearing can be in such ratio as to cause one revolution of the sprocket for each turn of the pedals.

With these and other objects in view which will appear as the description proceeds, my invention resides in the combination and arrangement of parts hereinafter described and set forth in the claims.

Figure 9:
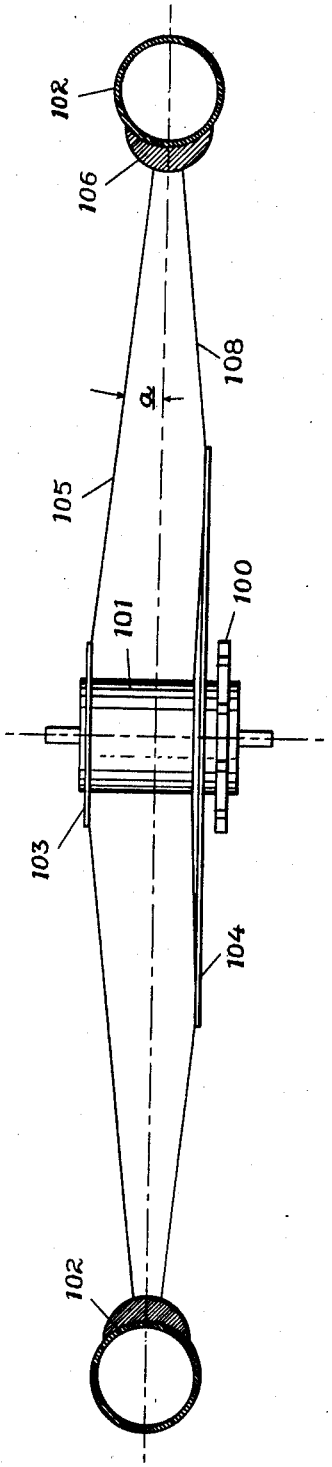
Figure 10:
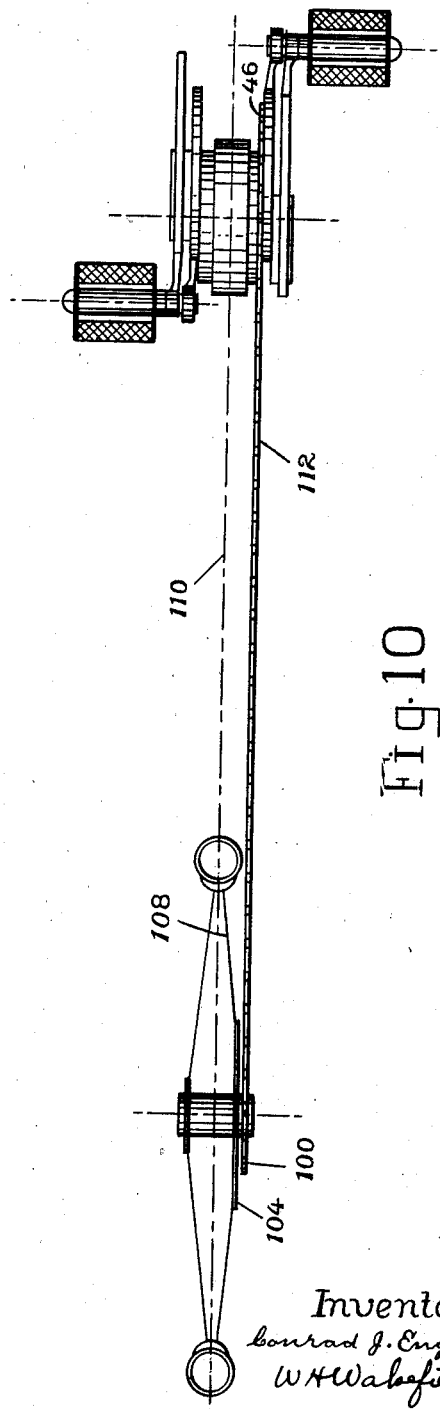

In the accompanying drawings, where two forms of my invention are shown,

Fig. 1 is a side elevation of the preferred form of my invention, one pedal being in high position at the beginning of a down working stroke, Fig. 2 is a back elevation of the structure shown in Fig. 1, both pedals being illustrated, Fig. 3 is a vertical section, on an enlarged scale, on line 3—3, Fig. 1, Fig. 4 is a detail vertical section on line 4—4, Fig. 1, enlarged, Fig. 5 is a side elevation of the gear and pinion case seen in Fig. 1, Fig. 6 is a vertical section on line 6—6 of Fig. 5, Fig. 7 is a detail vertical section on line 7—7, Fig. 1, enlarged, Fig. 8 is a view similar to part of Fig. 6 showing a modified form of the invention, Fig. 9 is a cross section through the rear wheel of a bicycle showing the relation between the spokes and their supporting plates, and Fig. 10 is a plan view showing the rear wheel of Fig. 9 on a reduced scale and the manner in which it is connected to the driving mechanism by the chain.

In illustrating my invention I have not thought it necessary to show the whole frame and wheels of the usual bicycle, but have shown three frame bars 10, which support the matter to be described hereinafter. These bars are of usual location on the bicycle, and being supported by the wheels, not shown, afford a mounting for my invention. The bars are directly connected to a casing 11, as suggested in Fig. 5, having a cylindrical form with its axis occupying the same place as the sprocket axis of the usual bicycle. The casing comprises a circular shell 12, having right and left end plates 13 and 14, respectively, as viewed in Fig. 6, secured to the casing as at 15 to form a closed chamber 16.

Extending concentrically through the chamber is a driving shaft designated at 17, the ends of which are substantially alike. Each end is tapered as at 18, see right side of Fig. 6, and fastened thereto is a hub 19, which is tapered internally to fit the end of shaft 17 and is held in place by a screw 20, threaded into the end of the shaft, and engaging a hub-shoulder 21. The outer cylindrical surface of the hub carries the inner ring of a ball race 22, the outer race 23 of which is received by a bearing seat 24, which is formed integral with plate 13. In a similar way the left end of the shaft carries a hub 25, the outer ball race at that end being housed in a race seat 26, integral with plate 14. The shaft 17 is thus mounted to rotate freely and concentrically on balls 27 with respect to the supporting casing.

Secured to the shaft 17 between the two hubs on the shaft is a gear 28, held against a collar 29 on the shaft by a nut 30. The gear 28 turns with the shaft and meshes in with a pinion 31, which is fast on a stud-shaft 32, the left end of which is driven into an inner ball race 33, the corresponding outer race 34 of which is housed in a seat 35, formed on plate 14, and balls 36 complete the bearing.

At the right of pinion 31 is a second ball bearing, having inner and outer races 37 and 38, respectively, which gives additional bearing for the stud-shaft 32. Race 38 is located in a race seat 39, formed on the right plate 13. A dust plate 40 is set into the lower part of the plate 14, to protect the left end of the stud shaft and its bearings. There is a bottom cover 41 to the casing 11, which is held in place by screws 42. This arrangement holds the ball races 34 and 38, and the dust plate 40, firmly in place.

The right end of the stud-shaft has secured thereto a second pinion 43, which meshes in with a ring gear 44, which in turn is fastened at several points as at 45 to the driving sprocket 46. A flange 47 on the sprocket fits closely to the inner surface of the ring gear 44 and receives an outer ball race 48 for balls 49, the inner corresponding race 50 is driven onto a shouldered race seat 51, integral with plate 13. There is sufficient clearance between the sprocket and pinion 43 and a dust guard at 52 to permit free rotation without frictional engagement with these parts. The sprocket will be connected by the usual chain, not shown, to the rear wheel of the bicycle. At 53 an exposed tooth of ring gear 44 is shown in Fig. 6.

From the matter thus far described, it will be seen that rotation of shaft 17 will turn drive gear 28, also pinions 31 and 43, and the ring gear 44 which drives the sprocket wheel. Fig. 6 shows the preferred form of the invention, wherein pinions 31 and 43 are of equal diameters, hence one rotation of gear 28 will cause one rotation of the sprocket.

The mechanism for driving the shaft 17 is shown more particularly in Figs. 1 and 2. As in the usual bicycle, I provide two pedals, one on each side of the fixed casing, and set them 180° apart on their axis.

Unlike the usual construction, however, the pedals do not rotate about the axis of the sprocket wheel, but are mounted so that their axis is in front of the shaft 17, the pedals and parts associated with them are the same on both sides of the casing 11, and include an inner ring 54, which is secured to the adjacent casing sideplate, so that it is fixed with respect to the vehicle frame.

This inner ring 54 is fitted to a seat 55, which is provided on the adjacent casing side plate 13 and secured thereto at tapped out holes 56, with screws 57, as shown in Figs. 1 and 5. Rotatable around each ring 54 is a second ring 58, which rolls on balls 59. The inner race for balls 59 is formed in part by ring 54, as at 60, and in part by a separate ring 61, which is secured to the inner ring 54, by screws 62, as shown in Fig. 4. The rings have concentric concave surfaces to receive the balls 59, the outer ring 58 moves with a minimum of friction.

Secured to each outer ring 58 is an arm 63, the outer end of which is shown in detail in Fig. 3. This arm 63 has a cupped bearing seat 64 receiving an outer ball race 65, while the inner race is formed of two race-forming elements 66, which are driven on the reduced end 67 of a pedal stud-shaft 68, after the balls 69 are in place. A nut 70 is threaded on the inner end 67 of the stud-shaft 68, which holds the elements 66 against the stud-shoulder 71 of the larger part of the stud shaft 68.

An internal nut 72 is threaded into the cupped bearing seat 64, which holds the outer 65 in place. The stud 68 is extended throughout the foot pedal, shown conventionally at 73. The pedal and stud shaft 68, therefore, rotate around the fixed ring 54 when the rider operates the pedals in the usual manner.

In Fig. 1, the vertical lines A—A and B—B pass through the axis of the shaft 17 and ring 54, respectively.

Stud 68, therefore, rotates in a path eccentric with respect to the shaft 17, and when it is in front of the shaft it is farthest from it, and is nearest to the shaft when it is behind it. In order to communicate motion from the pedal to the shaft, some account must be taken of the eccentric path of the pedal. As shown herein, I provide a sliding driving connection between the stud 68 and shaft 17.

Returning to Fig. 6, each hub 19 and 25 is formed integral with an inner block 74. Each of these blocks is associated with a second similar block 75, spaced outwardly from its companion.

Between these blocks lie rolls 76, with peripheries V-shaped as at 77. Fig. 7 shows the mounting for a roll. A bearing 78 extends through the block 74 and has a head 79 set into the block. A screw 80 extends through the other block 75 and is threaded into the bearing 78. The screw 80 has a head 81, which is set into the block 75, and the heads 79 and 81 hold the two blocks together. Rotatable around each bearing 78 is one of the rolls 76 and ball bearings 82 at each of their sides, to permit free turning of the rolls on their centers. It being the duty of these side-ball-bearings 82 to prevent friction due to side strains subjected to these parts.

Each pair of blocks forms in effect a crank arm on the shaft 17. As seen in Fig. 1, the greater part of the length of the crank arm lies at one side of the shaft 17, and from Fig. 2 it is seen that the crank arms, one at each side of casing 11, project in opposite directions. Each crank arm is caused to turn by a connector 83, having a head 84 into which the large part of the corresponding stud 68 is threaded.

The connector 83 extends from its head towards the blocks on the same side of the casing 11 and is slotted as at 85, the parallel sides 86, which form the slot having ribs V-shaped in cross-section, to fit the peripheries 77 of the rolls 76. The slot 85 is of such length as to permit a complete rotation of the stud 68, without interference between the blocks and the connector.

In operation, the rider of the bicycle will turn the pedals in the usual manner, in the direction of arrow a, as shown at the top of Fig. 1, around the center of ring 54 as an axis. Starting from the position shown in Fig. 1, the pedal will move to the right, along a path which moves away from the shaft 17, causing the slotted part of the connector 83 to move in a direction to increase the length of the power arm of the connector, which acts on its blocks or crank arm. The rider is therefore at an advantage, which increases until the pedal reaches the horizontal line C, at a position in front of the shaft 17. As the pedal continues to turn, it starts to move back toward the shaft, the advantage diminishing until the pedal crosses line B—B, after which the down motion of the pedal ceases. At this time, the other pedal is in high position, and it is pushed down in turn to repeat the motion and effect on shaft 17 of the pedal already described.

Throughout the downward working stroke of each pedal, except at the instant of starting and finishing, the power arm represented by the effective length of the connector in descent is longer than could be obtained with the usual bicycle drive, without excessive permanent lengthening of the pedal arms. The turning of the blocks causes turning of the shaft 17 and the sprocket to drive the vehicle, as already described.

If fuller advantage is to be taken of the relationship already described, the gearing shown diagrammatically in Fig. 8 may be used.

This figure is similar to Fig. 6, but instead of having the two pinions and gears of equal diameters, that shown in Fig. 8, which shows the pinion 90 to be smaller in diameter than pinion 31, shown in Fig. 6, and the driving gear 91 is shown to be necessarily larger in diameter than the drive gear 28, shown in Fig. 6, hence the stub-shaft 32 now turns faster than in the preferred form, shown in Fig. 6. The actual amount of the different speed ratios may be determined by the ratio of the diameters of the driven pinions, and the ratio of the diameters of the driving gears.

Because of the relation between the pedal, the eccentric ring, and the sprocket wheel, shown particularly in Fig. 2, the chain is spaced farther from the rider's pedal than usual, being nearer the center-line of the bicycle frame than ordinarily. As a result of this relationship, the sprocket pinion 100 is nearer the central plane of the driven rear wheel than customarily, and therefore, provision must be made for accommodating this condition to the spokes of the rear wheel of the bicycle, as shown in Fig. 9, the hub 101 of the rear wheel, designated generally at 102, has a relatively small ring or flange 103 secured at one end thereof, while the sprocket-pinion 100 is secured to the other end thereof. A relatively large ring or flange 104 is secured to the hub 101, between the sprocket pinion 100 and flange 103, as suggested in Fig. 9. The long spokes 105 connect to the small flange 103, and the rim 106 of the wheel 102, forming with the central plane of the wheel, some such angle as that designated at $a$, in Fig. 9. In that figure, the dot and dash line represents the central plane of the weave. In order that this same angle may be formed by the spokes 108, I use the large flange 104, connecting the short spokes 108 to the periphery of the large flange, thus preserving the same angle between the central plane of the wheel and the short spokes 108, as that indicated at $a$.

The reason for the large flange 104 will be apparent from Fig. 10, where the dot and dash line 110 represents the central plane of the rear wheel and of the driving mechanism. The chain 112 is driven by the sprocket 46 and drives the sprocket-pinion 100.

By the disposition of the short spokes 108 and the large flange 104, as suggested in Fig. 10, I am enabled to place the driving pedals symmetrically with respect to the center of the bicycle, which in Fig. 10 is indicated by line 110.

From the foregoing, it will be seen that I have provided a driving gear for bicycles, wherein the pedals move around an axis in front of the sprocket axis. It will be seen also that power is transmitted to the shaft 17 through a sliding connection which provides the advantage of the eccentric relationship to be communicated to the shaft 17. Further, the gearing within the casing transfers the rotation of the shaft to the sprocket either by a 1 to 1 relation, as that shown in Fig. 6, or by means of the driving gear 91, and pinions 90 and 43 as that shown in Fig. 8, which is with a mechanical advantage.

It will further be understood that I have modified the rear wheel of the bicycle to permit a symmetrical arrangement of the driving pedals, and to preserve the same angle between the right and left spokes of the rear wheel 102 with respect to the central plane of the bicycle, as suggested in Fig. 10, by using a relatively large flange or ring 104 to which the short spokes 108 are attached. With such an arrangement, the plane of the driving chain can be kept parallel with the central plane of the bicycle, and sufficient room provided for the rear sprocket and the driving chain.

Having thus described my invention, it will be seen that changes and modifications may be made therein, by those skilled in the art without departing from the spirit and scope of the invention, and I do not wish to be limited to the details herein disclosed.

But what I claim is:

1. In driving gear for a bicycle having a frame, a hollow casing fixed with respect to the frame, a shaft extending therethrough and supported by each side of the casing, means to rotate the shaft, a relatively large gear secured to the shaft and located within the casing, a pinion meshing with the gear, a stub shaft to which the pinion is secured rotatable about an axis fixed with respect to the casing, a second pinion outside the casing secured to the stub shaft, a ring gear outside the casing meshing with the second pinion outside the casing, and a driving chain sprocket wheel secured to the ring gear.

2. In driving gear for a bicycle having a frame, a casing supported by the frame, a driving shaft extending through the casing and supported by each side of the casing and rotatable with respect thereto, a gear secured to the shaft within the casing, a stub shaft rotatable on the casing, a pinion secured to the stub shaft and meshing with said gear, a second pinion outside the casing secured to the stub shaft rotating with the first pinion, a ring gear meshing with a second pinion outside said casing, means to mount the ring gear for rotation with respect to and outside the casing, and a driving chain sprocket wheel secured to the ring gear.

3. In a driving gear for a bicycle having a frame, a hollow casing supported by the frame, a shaft extending through and supported by each side of the casing and rotatable with respect to the casing, a pair of driving arms secured to the shaft, one located on each side of the casing, a gear within the casing secured to the shaft, a stub shaft extending through and rotatable with respect to the casing, a pinion within the casing secured to the stub shaft and meshing with the gear, a second pinion secured to the stub shaft outside the casing, a ring gear outside the casing meshing with the second pinion, means to mount the ring gear for rotation with respect to the casing, and a driving chain sprocket wheel secured to the ring gear, the ring gear and sprocket wheel being located between the casing and one of said driving arms.

4. In a driving gear for a bicycle having a frame, a hollow casing supported by the frame, a shaft extending through and supported by each side of the casing and rotatable with respect to the casing, a pair of driving arms secured to the shaft, one located on each side of the casing, a drive gear within the casing secured to the shaft, a stub shaft rotatable with respect to the casing, a pinion secured within the casing to the stub shaft and meshing in with the gear, a second pinion secured to the stub shaft, a ring gear meshing in with the second pinion outside the casing, means to mount the ring gear outside the casing for rotation with respect to the casing, and a driving chain sprocket wheel secured to the ring gear, the ring gear being located between the said casing and one of the said driving arms.

5. In a bicycle driving gear, a frame for the bicycle, a hollow casing supported by the frame, a shaft extending through the casing and rotatably mounted on each side of said casing, a pair of pedal arms mounted to rotate eccentrically with the shaft, means to cause the shaft to rotate with a constant speed as the pedal arms rotate variably, a gear within the casing secured to the shaft, a pinion meshing in with the gear and rotatable with respect to the casing, a second pinion outside the casing rotating with the first pinion and having a diameter different from the first named pinion, a second gear outside the casing meshing in with the second pinion, and a driving chain sprocket wheel secured to the second gear.

6. In a driving gear for a bicycle having a frame, a casing secured to the frame, a shaft extending through and supported by and rotatable with respect to each side of the casing, a pair of pedal arms rotatable about a given axis, means to cause the said shaft to rotate with a constant speed when the pedal arms rotate variably, the said pedal arms rotating about a center in front of the axis of the shaft with respect to the bicycle frame, a gear of given diameter within the casing secured to the shaft, a pinion of smaller diameter than the second pinion, meshing in with the gear, and rotatable with respect to the casing, a second pinion outside the casing rotating with the first pinion, a second gear smaller in diameter than the first gear outside the casing, meshing in with the second pinion of a larger diameter than the first pinion, and a driving chain sprocket wheel secured to the second gear.

7. In a driving gear for a bicycle having a frame, a hollow casing having spaced sides fixed with respect to the frame, a shaft extending through the casing and supported by each of said sides, means to rotate the shaft, a relatively large gear secured to the shaft within the casing and located between said sides, a pinion in the casing meshing with the gear, a stub shaft rotatably mounted with respect to the casing and to which the pinion is secured, a second pinion secured to the stub shaft, a ring gear rotatably mounted on the exterior of one of said sides of the casing and meshing with the second pinion, and a driving chain sprocket wheel secured to the ring gear.

8. In a driving gear for a bicycle having a frame, a hollow casing having spaced vertical walls mounted on the frame, a shaft extending through the casing and supported by each of the walls, means to rotate the shaft, a relatively large gear secured to the shaft between said walls, a pinion meshing with the gear, a stub shaft rotatably mounted with respect to the casing and to which the pinion is secured, a second pinion secured to the stub shaft, a ring gear meshing with the second pinion, an annular bearing on the outside of one of said walls on which the ring gear is rotatably mounted, and a driving chain sprocket secured to the ring gear, said annular bearing and ring gear lying between the sprocket wheel and the adjacent wall of the casing.

9. In a driving gear for a bicycle having a frame, a hollow casing fixed to the frame and having spaced vertical walls, a shaft extending horizontally across the casing and rotatably mounted with respect to each of the walls, means to rotate the shaft, a relatively large gear secured to the shaft between said walls of the casing, a stub shaft parallel to the first named shaft and rotatably mounted with respect to the casing, a pinion on said stub shaft meshing with the gear, a second pinion on said stub shaft, said stub shaft and pinions rotating as a unit, a ring gear meshing with the second pinion, an annular bearing on the outside of one of the walls of the casing for said ring gear, said annular bearing lying in a plane between the ends of the first named shaft and the latter having one end thereof passing through said annular bearing, and a driving chain sprocket wheel secured to the ring gear.

CONRAD J. ENGLERT.